US012450995B1

(12) United States Patent
Maddox, Sr.

(10) Patent No.: US 12,450,995 B1
(45) Date of Patent: Oct. 21, 2025

(54) SMOKE DETECTION ATTACHMENT DEVICE

(71) Applicant: Larry C. Maddox, Sr., Birmingham, AL (US)

(72) Inventor: Larry C. Maddox, Sr., Birmingham, AL (US)

( * ) Notice: Subject to any disclaimer, the term of this patent is extended or adjusted under 35 U.S.C. 154(b) by 0 days.

(21) Appl. No.: 18/664,681

(22) Filed: May 15, 2024

Related U.S. Application Data

(60) Provisional application No. 63/466,665, filed on May 15, 2023.

(51) Int. Cl.
*G08B 17/10* (2006.01)

(52) U.S. Cl.
CPC .................................... *G08B 17/10* (2013.01)

(58) Field of Classification Search
CPC .. G01N 33/0031; G05B 15/02; G06F 1/1632; G06F 3/017; G06F 21/88; G08B 17/10; G08B 25/008; G08B 25/016; G08B 29/02; G08B 29/10; G08B 29/126; H04L 67/12; H04M 1/0258
USPC .......................................................... 340/628
See application file for complete search history.

(56) References Cited

U.S. PATENT DOCUMENTS 4,540,980 A 9/1985 Porco
4,558,181 A 12/1985 Blanchard et al.
5,745,849 A 4/1998 Britton
6,697,645 B1 2/2004 MacFarlane
10,193,365 B2 1/2019 Balmer
10,482,785 B2 11/2019 Buser et al.
2003/0104800 A1* 6/2003 Zak .................. H04M 1/72421 455/564
2006/0164241 A1* 7/2006 Makela ............ H04M 1/72403 340/630
2008/0151056 A1 6/2008 Ahamefula
2014/0080553 A1* 3/2014 Torset ................... G06F 1/1632 455/575.8
2017/0193805 A1* 7/2017 Stagg .................. G08B 29/185
2022/0151478 A1* 5/2022 Lynn ........................ A61B 1/04
2022/0338723 A1* 10/2022 Farkash ................. A61B 1/053

FOREIGN PATENT DOCUMENTS

CN 214101444 U * 8/2021 ............. H04M 1/02
GB 2459464 A * 10/2009 ............ G08B 17/10

* cited by examiner

*Primary Examiner* — Stephen R Burgdorf
(74) *Attorney, Agent, or Firm* — Cramer Patent & Design; Aaron R. Cramer

(57) ABSTRACT

The present device pertains to a smoke detection attachment device that can be removably attached to a mobile telephone. It comprises a first and second portion connected by a bridge, creating a gap that snugly fits over the phone. Equipped with dual sensors, the device detects environmental dangers, issuing alerts through auditory and transmitted signals. It attaches using two spring clips at each end of the bridge, ensuring easy attachment and removal. The device features a power management system utilizing the phone's power supply and an onboard backup battery to remain operational during power outages. This device is ideal for locations without standard smoke detectors, offering portable and continuous safety monitoring linked to mobile phones.

2 Claims, 3 Drawing Sheets

SMOKE DETECTION ATTACHMENT DEVICE

RELATED APPLICATIONS

The present device was first described in and is a continuation of U.S. Provisional Application No. 63/466,665, filed May 15, 2023, the entire disclosures of which are incorporated herein by reference.

FIELD OF THE DEVICE

The present device relates to a device capable of sensing elevated levels of smoke and carbon monoxide (CO) and to transmit an alarm; said device is configured to removably attach to a mobile telephone.

BACKGROUND OF THE DEVICE

As any homeowner will attest, security is an area of primary concern. Due to the fact that people tend to place a high value on their property and personal safety, the marketplace has responded with a variety of products that are intended to protect one's life and property. Perhaps the most common of these products is the smoke detector. However, smoke detectors have remained little changed since their introduction. In most cases, they are "dumb" products that simply sound an audible alarm. As such, they suffer from many drawbacks such as dead or missing batteries, clogged sensors, poor location, or the like. While one has some control of these problems at home, one is at the mercy of the diligence of others when sleeping at a hotel or someone else's home. However, it is not always practical or convenient to carry a separate dedicated smoke detector at all times. Accordingly, there exists a need for a means by which the life-saving capability of a smoke detector can be provided at all times in a manner that address the above-mentioned shortcomings. The use of the smoke detection attachment device provides users with the lifesaving ability of a personal smoke detector wherever and whenever their mobile telephone is present.

SUMMARY OF THE DEVICE

Embodiments of the present disclosure may include a smoke detection attachment device configured to be removably attached to a mobile telephone, the device including a first portion and a second portion. Embodiments may also include a bridge portion interconnecting the first and second portions. Additionally, embodiments may include a gap formed between the inner faces of the first portion, the second portion, and the bridge portion.

In some embodiments, the gap may be configured to accommodate a portion of the mobile telephone. Embodiments may also include attachment means for removably securing the device to the mobile telephone. In some embodiments, the attachment means includes a first clip at one end of the bridge portion and a second clip at the opposite end of the bridge portion, each clip designed to securely attach to the mobile telephone without interfering with its functionality.

In some embodiments, the first and second portions may be mirror images of each other and may be of identical shape and size. In some embodiments, the smoke detection attachment device may include a first sensor housed within the first portion, configured to detect a first environmental element and determine a first danger. Embodiments may also include a second sensor housed within the second portion, configured to detect a second environmental element and determine a second danger.

In some embodiments, the first danger and the second danger may each be associated with a respective alarm, the alarms capable of being auditory and transmitted wirelessly to a remote monitoring station. In some embodiments, the clips may be metal spring clips capable of deforming without damage for ease of attachment and removal. In some embodiments, the smoke detection attachment device may include a power management system configured to utilize the power supply of the mobile telephone and an onboard backup battery to maintain the operational status of the device.

In some embodiments, the power management system includes a battery cover through which an onboard replaceable battery may be accessible. In some embodiments, the device may be operable with a dedicated application on the mobile telephone to enable reporting and monitoring of detected dangers. In some embodiments, the smoke detection attachment device, configured to provide continuous safety monitoring and portable detection capabilities, is particularly beneficial in locations without standard smoke detection systems. In some embodiments, the device may be characterized by its compact size and design, suitable for carrying in a user's pocket, and its construction may be such that it does not require any external power sources beyond those described.

BRIEF DESCRIPTION OF THE DRAWINGS

The advantages and features of the present device will become better understood with reference to the following more detailed description and claims taken in conjunction with the accompanying drawings, in which like elements are identified with like symbols, and in which:

DESCRIPTIVE KEY

Figure 1:
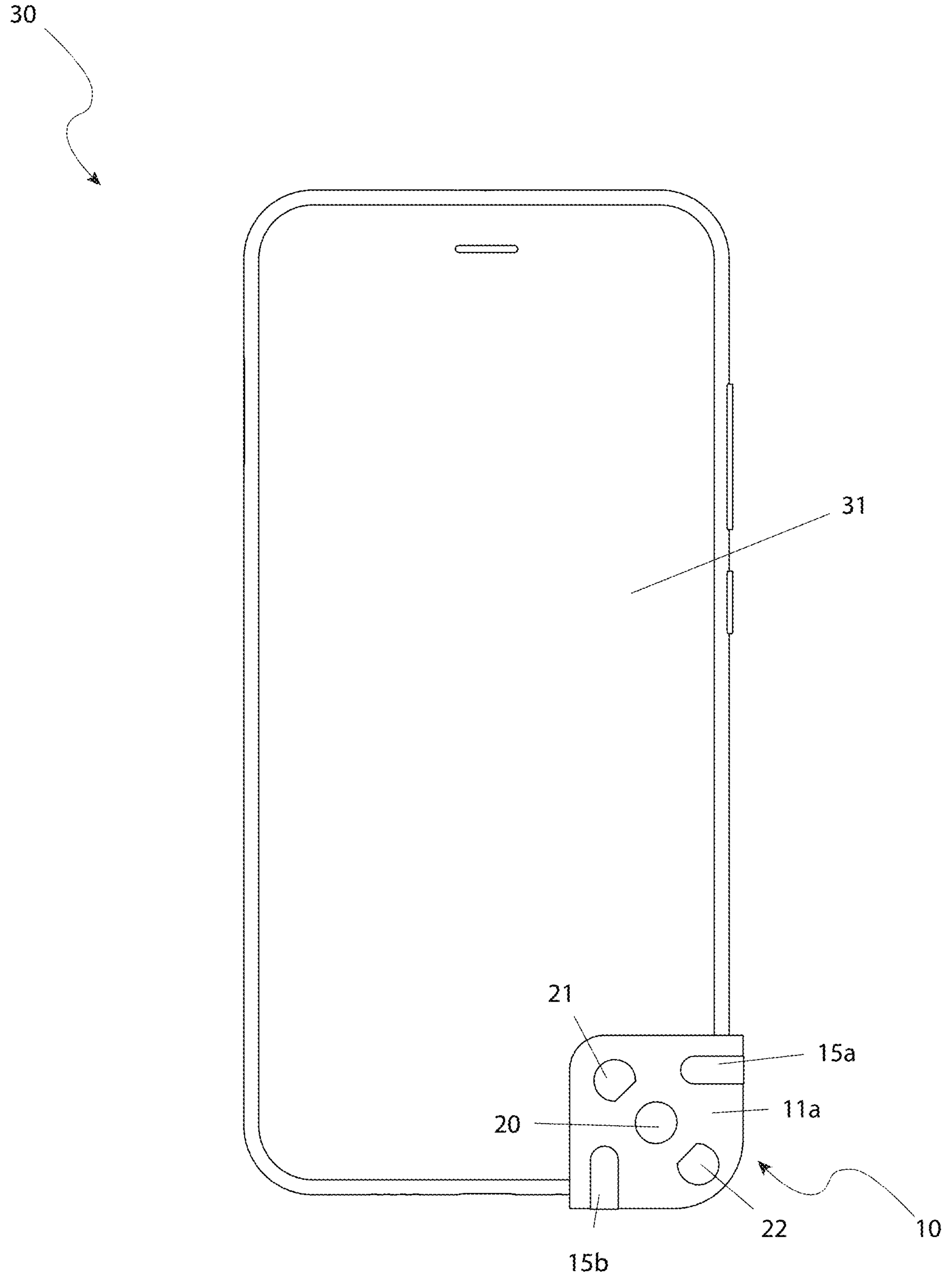
FIG. 1 is an environmental view of a smoke detection attachment device 10 attached to a mobile telephone 30, according to an exemplary method of use of a preferred embodiment of the present device.
Figure 2:
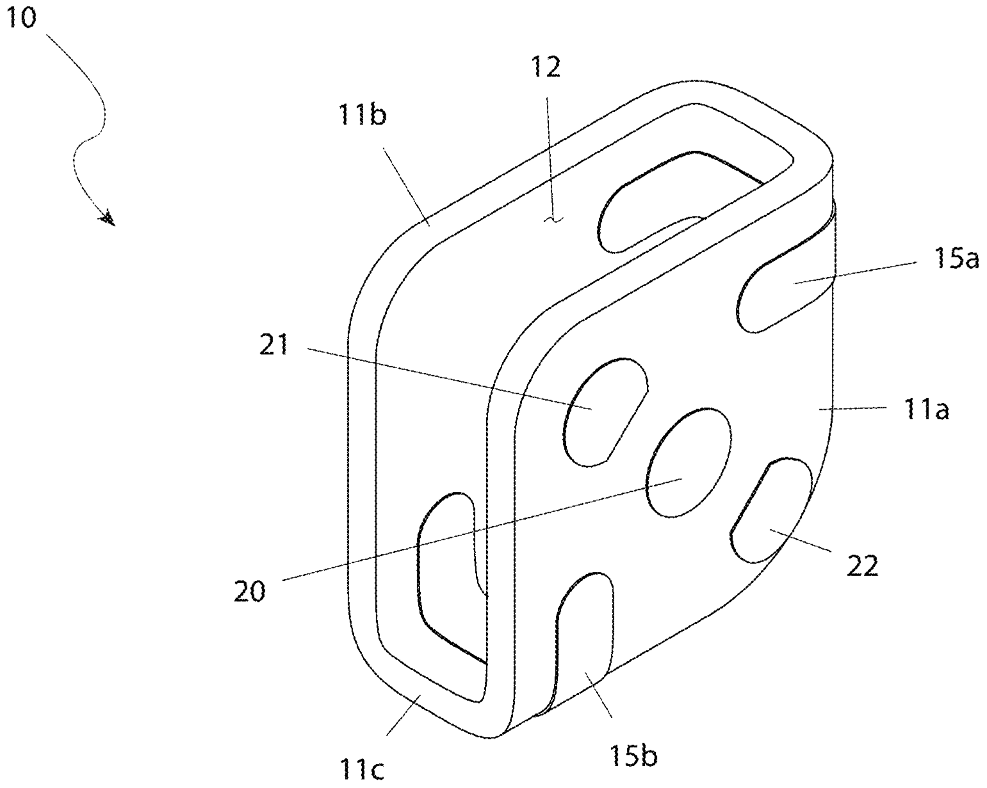
FIG. 2 is a top front right view of the smoke detection attachment device 10, according to the preferred embodiment of the present device.
Figure 3:
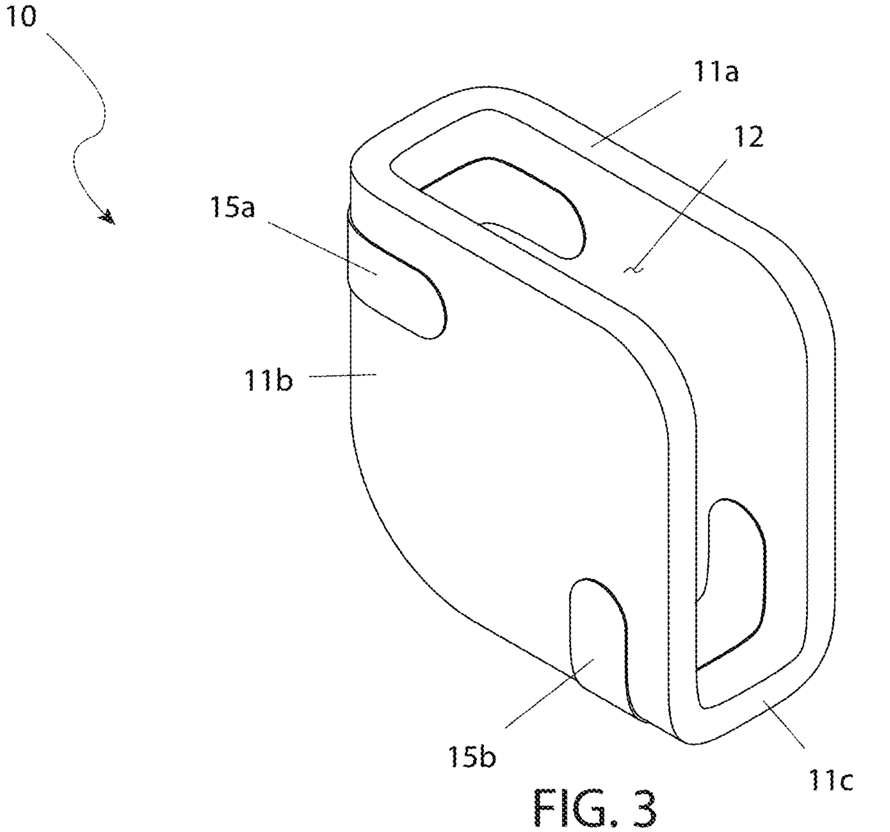
FIG. 3 is a top rear left view of the smoke detection attachment device 10, according to the preferred embodiment of the present device.
Figure 4:
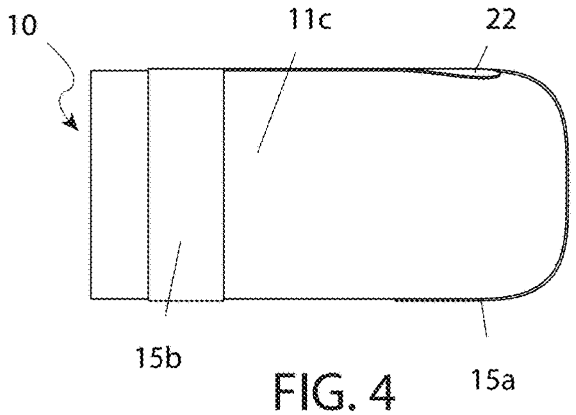
FIG. 4 is a bottom plan view of a smoke detection attachment device 10, according to the preferred embodiment of the present device.
Figure 5:
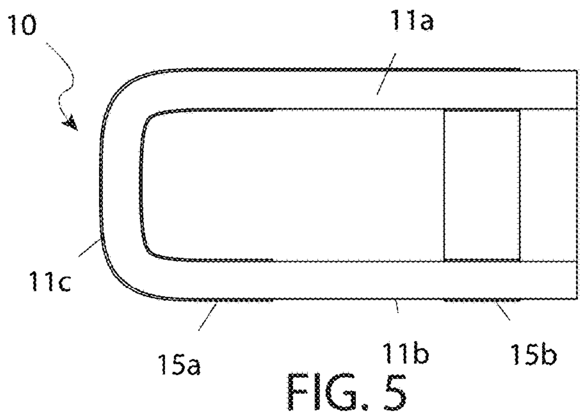
FIG. 5 is a top plan view of the smoke detection attachment device 10, according to the preferred embodiment of the present device.
Figure 8:
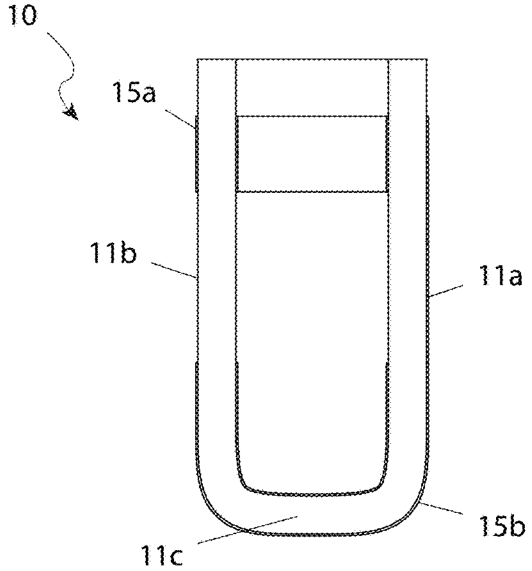
FIG. 8 is a front elevation view of the smoke detection attachment device 10, according to the preferred embodiment of the present device; and, FIG. 9 is a rear elevation view of the smoke detection attachment device 10, according to the preferred embodiment of the present device.
Figure 9:
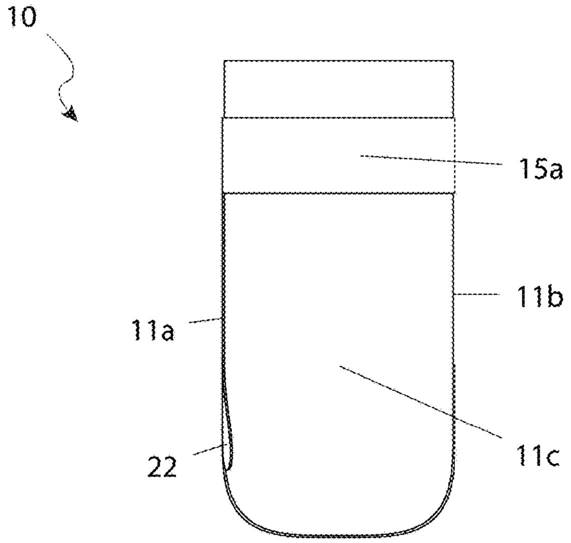
Figure 6:
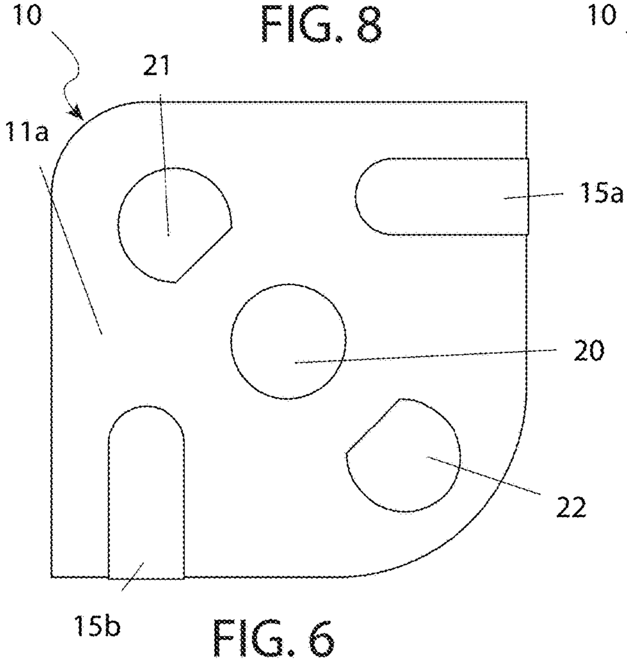
FIG. 6 is a first side elevation view of the smoke detection attachment device 10, according to the preferred embodiment of the present device.
Figure 7:
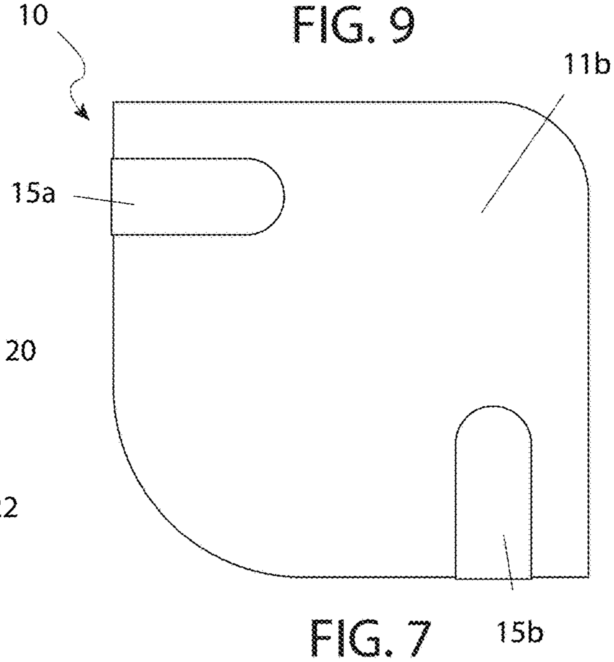
FIG. 7 is a second side elevation view of a smoke detection attachment device 10, according to an exemplary method of use of a preferred embodiment of the present device.

10 smoke detection attachment device
11*a* first portion

11*b* second portion
11*c* bridge portion
12 gap
15*a* first clip
15*b* second clip
20 battery cover
21 first sensor
22 second sensor
30 mobile telephone
31 telephone front side
32 telephone bottom side Description of the Device The best mode for carrying out the device is presented in terms of its preferred embodiment, herein depicted within FIGS. 1 through 9. However, the device is not limited to the described embodiment, and a person skilled in the art will appreciate that many other embodiments of the device are possible without deviating from the basic concept of the device and that any such work around will also fall under scope of this device. It is envisioned that other styles and configurations of the present device can be easily incorporated into the teachings of the present device, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

1. Detailed Description of the Figures

Referring to FIG. 1, the smoke detection attachment device 10, is configured to be removably attached to a mobile telephone 30. As can be seen, the smoke detection attachment device (herein described as the "device") 10 is clipped on the thin portion of the mobile telephone 30. Such a position is most preferably located away from most of the functional buttons and screen of the mobile telephone 30, such as the corner junction of a telephone front side 31 and a telephone bottom side 32. Although the exemplary embodiment in FIGS. 1-9 illustrates the bottom right corner, and the device 10 is shaped as such, it is appreciated that any location on the mobile telephone 30 that enables the device 10 to removably attach thereto may dictate the overall complementary shape of the device 10.

Referring more closely now to FIGS. 2 through 9, various views of the device 10 are herein described. The present device provides for a small plastic unitary element, comprising a first portion 11*a*, a second portion 11*b*, and a bridge portion 11*c* that bridges or interconnects the first portion 11*a* to the second portion 11*b*. A gap 12 is defined as the space bounded by the inner faces of each the first portion 11*a*, second portion 11*b*, and bridge portion 11*c*. The first portion 10*a* and second portion 11*b* are configured to be in a relatively identical shape and size and may be mirror images of each other. The bridge portion 11*c* can be attached to any portion of the first portion 11*a* and second portion 11*b*, so long as the gap 12 is formed and present. The gap 20 is preferably of a size and shape to enable snug coverage over the telephone front side 31 and telephone bottom side 31*b*, as can be seen in FIG. 1.

A first clip 15*a* is located at a first end of the bridge portion 11*c* and a second clip 15*b* is located at a second end of the bridge portion 11*c*. The first clip 15*a* and second clip 15*b* may be identical in function to provide a secure fit of the device 10 to the mobile telephone 30. The first clip 15*a* and second clip 15*b* may be metal spring clips capable of deforming without being damaged or destroyed. The size of the device 10 enables being carried in one's pocket. In the exemplary embodiment, the first clip 15*a* and second clip 15*b* are oriented perpendicular to each other.

The first portion 11*a* also includes a first sensor 21 capable of detecting a first environmental element and determining if there is a first danger, and a second sensor 22 capable of detecting a second environmental element and determining if there a second danger. The first danger is associated with a first alarm and the second danger is associated with a second alarm. The first alarm and second alarm may be audible alarms, but in most embodiments will also include a first transmitted alarm and a second transmitted alarm. The first and second transmitted alarms are capable of being wirelessly transmitted to a remote monitoring station, which may be a dedicated application on the mobile telephone 30 to which the device 10 is attached. In certain embodiments, the first sensor 21 is configured with all of the sensors and circuitry to detect a first environmental element that may be deemed a first danger, like a smoldering fire. In certain embodiments, the second sensor 22 is configured with all of the sensors and circuitry to detect a second environmental element that may deemed a second danger, like elevated levels of carbon monoxide (CO). Such a first danger and a second danger can be calculated when the sensed first environmental element or second environmental element passes a pre-determined threshold. The device 10 then works with a dedicated application on the mobile telephone 30 to allow for reporting of the first danger and/or second danger, in the manner of wirelessly transmitting the first and/or second transmitted alarms. The battery of the device 10 is configured to utilize the power supply of the mobile telephone 30 so as to not require any batteries or external power source, such as wired or wireless power transfer. As such, whenever the device 10 is paired with the mobile telephone 30, the device 10 is operational. The device 10 may also be provided with a replaceable on-board battery capable of being accessed through a battery cover 20.

While the device 10 can be used anywhere, it is viewed as especially beneficial when sleeping in a location away from home such as a hotel, where there may not be a functional smoke detection system. The features of the device 10 allow the user to carry a complete smoke detector system wherever they go, particularly when considering the ubiquitousness of mobile telephones 30, almost always with their owner and necessary to be kept in a charged state. The device 10 preferably utilizes a back-up battery system to remain active when the mobile telephone 30 has been discharged of power.

In the all-inclusive embodiment of the smoke detection attachment device 10, as depicted in FIGS. 1 through 9, each element is meticulously integrated to ensure maximal functionality and user-friendliness. This embodiment consists of the first portion 11*a* and second portion 11*b*, each uniquely designed for symmetrical alignment and mirrored aesthetics, connected by the bridge portion 11*c*. The bridge portion enhances communication between the components and supports the device's advanced connectivity features. The gap 12 between these portions is precisely measured to snugly fit around the mobile telephone 30, specifically accommodating the telephone front side 31 and the telephone bottom side 32. The device 10 is securely attached to the mobile telephone 30 using two robust clips, the first clip 15*a* and the second clip 15*b*, positioned at either end of the bridge portion 11*c*. These clips are designed for durability and ease of attachment without interfering with the device's operation or mobile phone usability. Enhanced with cutting-edge technology, the first sensor 21 and second sensor 22 are capable of detecting a variety of environmental threats with increased sensitivity and precision, contributing to the device's comprehensive safety features. Moreover, the device incorporates an intelligent power management system housed under the battery cover 20, which efficiently manages power between the mobile phone's supply and an internal backup battery to ensure uninterrupted functionality. The system also includes a user-friendly interface on the corresponding mobile application, which provides intuitive controls and real-time environmental condition updates, promoting enhanced user interaction and safety awareness. Overall, this all-inclusive embodiment of the smoke detection attachment device 10 demonstrates a perfect amalgamation of all the described components, making it not only a practical everyday accessory but also an essential safety device for emergency situations.

The foregoing descriptions of specific embodiments of the present device have been presented for purposes of illustration and description. They are not intended to be exhaustive or to limit the device to the precise forms disclosed, and obviously many modifications and variations are possible in light of the above teaching. The embodiments were chosen and described in order to best explain the principles of the device and its practical application, to thereby enable others skilled in the art to best utilize the device and various embodiments with various modifications as are suited to the particular use contemplated.

What is claimed is:

1. A portable smoke and carbon monoxide detection attachment device configured to be removably attached to a mobile telephone, the portable detection attachment device comprising:

a unitary body including a first portion, a second portion, and a bridge portion connecting the first and second portions;

a gap defined between inner faces of the first portion, the second portion, and the bridge portion, the gap sized and shaped to snugly receive a portion of the mobile telephone;

a first clip at a first end of the bridge portion and a second clip at a second end of the bridge portion, each clip being a metal spring clip integrally formed with the body and configured to resiliently deform to attach to the mobile telephone without obstructing its functionality;

a first sensor housed within the first portion, configured to detect smoke as a first environmental condition;

a second sensor housed within the second portion, configured to detect carbon monoxide as a second environmental condition;

an audible alarm emitter within the unitary body, configured to emit a first alarm in response to smoke detection and a second, distinguishable alarm, distinguishable from the first alarm, in response to carbon monoxide detection;

a wireless transmitter within the unitary body configured to transmit corresponding alarm signals to a remote monitoring application executing on the mobile telephone;

an electrical coupling interface configured to draw operating power from the mobile telephone; and, an on-board backup battery accessible via a battery cover to provide power when the mobile telephone operating power is unavailable.

2. The portable detection attachment device of claim 1, wherein the first portion and the second portion are identical in shape and size, and wherein the first clip and the second clip are oriented perpendicular to each other to allow attachment at a corner region of the mobile telephone.

* * * * *